United States Patent [19]

Leenhouts et al.

[11] 4,220,904

[45] Sep. 2, 1980

[54] STABILIZING CIRCUIT FOR STEPPING MOTORS WITH UNIPOLAR SELF-DECAY CURRENT CIRCUITRY

[75] Inventors: Albert C. Leenhouts, Harwinton; Gurdial Singh, Avon, both of Conn.

[73] Assignee: The Superior Electric Company, Bristol, Conn.

[21] Appl. No.: 845,757

[22] Filed: Oct. 26, 1977

[51] Int. Cl.² ........................................ H02K 37/00
[52] U.S. Cl. .................................................. 318/696
[58] Field of Search ................ 318/696, 685, 254, 138

[56] References Cited

U.S. PATENT DOCUMENTS

| 3,728,598 | 4/1973 | May | 318/696 |
| 4,084,122 | 4/1978 | Gettings | 318/696 |

Primary Examiner—Gene Z. Rubinson

[57] ABSTRACT

The tendency of a unipolar energized stepping motor, having a circuit for enabling the self-decay of winding currents, to oscillate or flutter under some mid-velocity conditions is minimized by reducing the deviation of the motor's rotor from the synchronized position dictated by the energization of its winding by inversely altering the time about a nominal time when a change of the motor's energization is to occur after receipt of an input pulse in accordance with the extent of the decay current in the winding being deenergized.

14 Claims, 2 Drawing Figures

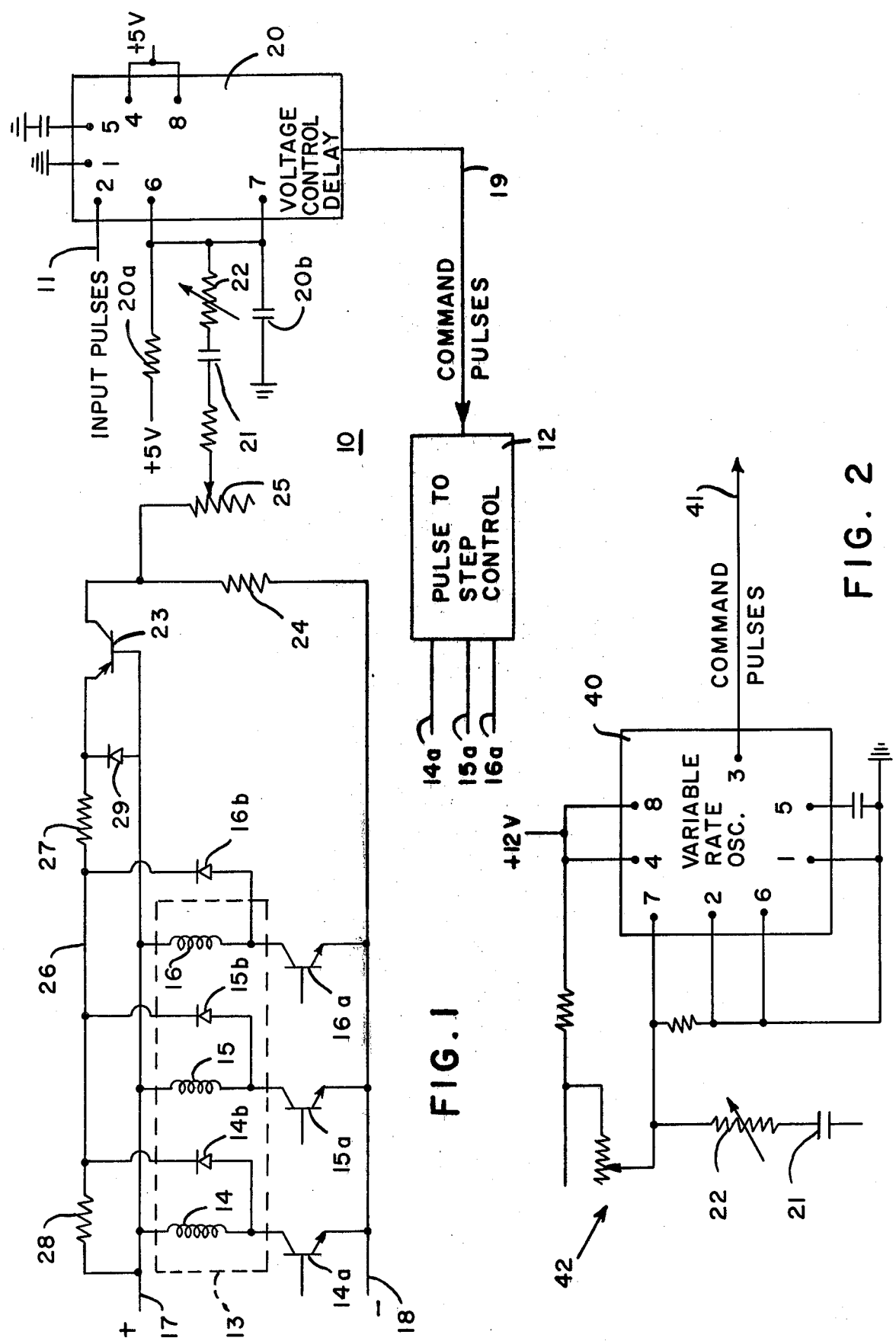

STABILIZING CIRCUIT FOR STEPPING MOTORS WITH UNIPOLAR SELF-DECAY CURRENT CIRCUITRY

In co-pending application Ser. No. 619,360, filed Oct. 3, 1975 by Albert C. Leenhouts and entitled Pulse to Step Motor Stabilization Circuit and in our co-pending application Ser. No. 704,005, filed July 9, 1976 and entitled Open Loop Motor Stabilization Circuit and Method, both being assigned to the assignee of the present invention, there are disclosed motor stabilizing circuits for maintaining the rotor essentially in synchronism or aligned with the position dictated by the energized windings. When the rotor deviates from its aligned position, the timing of the changes of energization are altered in a direction that reduces the deviation. In both applications, the extent of the deviation is sensed by the measuring of the current flowing in the windings with the later application having a system which specifically uses the extent or duration of the decay current which opposes the energizing current. Further, in the first filed application, the sensing tends to produce an average change over a plurality of command pulses while in the later application, the signal produced by one change of energization is utilized to alter the next change of energization thereby providing individual control over the timing for each change of energization.

While the above systems have been found satisfactory in reducing a stepping motor's tendency to oscillate at least in its mid-velocity operating range and at least in the later application, increasing the usable stepping range of the motor, the circuits have not been usable with motors which do not change the polarity of their poles. Thus stepping motors which have only a single winding for a pole which is energized to be unipolar by a change of the energization being a change from an energized state to a deenergized state, have not been able to heretofore obtain the advantages which have accrued to the above-noted reverse current type motors.

It is an object of the present invention to provide a method and system for minimizing the tendency of a stepping motor having single unipolar windings to oscillate or flutter at least during its mid-velocity operating range and which also tends to increase the usable operating range of the motor.

Another object of the present invention is to achieve the above object with a method and system that does not alter the relationship between the speed of the motor and the rate of the input pulses so that the motor operates at a speed set by the rate of the input pulses.

A further object of the present invention is to achieve the above objects with a method and system that is readily incorporated into existing pulse to step motor controls for controlling the energization of unipolar wound motors and which is capable of being used with different sized motors and in different motor applications with a minimum, if any, adjustment.

Still another object of the present invention is to provide a method and system for minimizing oscillatory tendencies of a unipolar stepping motor that is extremely economical to manufacture and which is completely electrical to be devoid of mechanical shaft sensing devices.

In carrying out the present invention, we have found that when a winding of a unipolar stepping motor is deenergized, that the inductance of the winding produces a decay current. The value and duration of the decay current appears to be related to the difference between the energy used to energize the winding and the energy that the winding imparts to the rotor. Moreover, the rotor tends to absorb energy in accordance with the deviation of its actual position relative to the position commanded by the energized winding. Thus if the rotor leads or is ahead of the stator commanded position, it absorbs less energy and the decay current is greater. When the rotor lags the stator commanded position, the rotor absorbs more energy and the decay current is accordingly less. The energy of the decay current is thus capable of providing a signal that is indicative of the actual rotor position from its stator commanded position.

The above findings are utilized in the present invention in a method and system which alters the time when a change of energization is to occur by the sensed quantity of energy of the decay current produced in a winding being deenergized. The system accepts input pulses at the rate at which the motor is desired to step, introduces a nominal delay before providing the change of energization of the motor's windings and then alters the nominal delay in accordance with the sensed quantity. The altering is inverse to the sensed quantity of decay current so that the instant when the next change of energization of the motor occurs causes the stator commanded position to be altered in a direction that reduces the deviation of the rotor from the commanded position. Thus for leading deviation, the energization is caused to occur quicker than the nominal delay while for lagging deviation, the delay is increased.

Other features and advantages will hereinafter appear.

In the drawing:

FIG. 1 is a schematic diagram of the present invention in which a system accepts individual input pulses for stepping a unipolar energized stepping motor.

FIG. 2 is another embodiment in which a system generates its own command pulses for a unipolar energized stepping motor.

Referring to the drawing, the system shown in FIG. 1 is generally indicated by the reference numeral 10 and accepts input pulses on a lead 11 with each input pulse causing a pulse to step control 12 to change the energization of a stepping motor 13.

In this specific embodiment herein shown, the motor is a unipolar wound, i.e. single winding motor and has three individual windings, 14, 15 and 16, each of which is connected in series with its own transistor, 14a, 15a and 16a, respectively, and in parallel across, a pair of unidirectional power leads 17 and 18 having the polarities shown. The base of each transistor is connected to its similarly identified output of the pulse step control 12 which accepts comand pulses on a lead 19.

As is well known in the art, the windings are energized in the sequence of 14, 15, 16, 14, etc., for one direction of movement and in the reverse sequence 14, 16, 15, 14, etc., for the other direction. The pulse to step control 12 accepts a command pulse on the lead 19 and simultaneously effects the deenergization of the energized winding and the energization of the next winding in the sequence essentially instantaneously with the receipt of a command pulse. The change is effected by causing the conducting transistor to be rendered non-conducting and the next winding non-conducting transistor to be rendered conducting.

In accordance with the embodiment of the present invention shown in FIG. 1, there is provided a voltage control delay 20. The delay 20 accepts each input pulse on the lead 11 and introduces a delay based on the values of a resistor 20a and a capacitor 20b before producing its corresponding motor command pulse on the lead 19 which consists of a high to low voltage change. The delay is altered in the present system in accordance with the charge on a capacitor 21. The positive side of the capacitor 21 is connected to the capacitor 20b through a variable resistor 22 while its other side is connected to the collector of a transistor 23.

When the transistor 23 conducts, it applies a charging current to the capacitor 21 to increase its negative charge which in turn shortens the delay between the receipt of an input pulse and the appearance of the corresponding command pulse by increasing the changing current to the capacitor 20b. When the transistor 23 is not conducting, the capacitor 21 can bleed some of its charge through a resistor 24. A variable resistor 25 is connected in series with the capacitor 21 for controlling the current flow thereto.

The transistor 23 has its base connected to the positive power lead 17 and its emitter connected to a lead 26 which through resistors 27 and 28 is also connected to the positive power lead 17. Further a diode 29 is connected between the base and emitter of the transistor 23.

A diode is connected between one end of each winding and the lead 26 with the diodes being indicated by the reference characters 14b, 15b and 16b for their similarly numbered windings. As the diodes are connected in parallel, any one of them is capable of conducting current to the lead 26 independently of the state of the other windings.

In the operation of the above circuit, when a winding is deenergized by its associated transistor being rendered non-conducting, a decay current will be produced which tends to flow in the same direction as the energizing current. The decay current thus flows through its assoicated diode to the lead 26 where some of it flows back to the power source through the resistor 28. The remainder flows through the transistor 23 to charge the capacitor 21. The quantity of current through the transistor 23 is directly proportional to the total quantity of the decay current as the transistor 23 is connected to have a gain of 1 and hence the charge applied to the capacitor 21 and the extent of the delay is directly related to the quantity of decay current.

With the herein disclosed embodiment, it will be understood that a decay current can exist in one winding while an energizing current exists in another winding, with the latter not effecting the former.

As above noted, the quantity of the decay current is directly related to the deviation of the rotor position with respect to the stator commanded position. For the leading deviations, i.e. the rotor is ahead of the stator commanded position, the quantity is greater than if the rotor is lagging the commanded position. This relationship may apparently be explained by each winding being energized with the same quantity of energy but by a leading rotor position absorbing less energy than a lagging rotor position with the remaining energy appearing as the decay current.

The system senses the quantity produced by the change of energization caused by one command pulse and applies it directly to the delay 20. By being so immediately applied, the delay 20 thus is conditioned to alter the delay in the next input pulse that becomes a command pulse. Hence the system operates to have the deviation sensed, when a present change of energization occurs, to control when the next command pulse will occur and produce essentially instantaneously its change of energization. Thus the system is capable of maintaining the phase angle within only a small range since it eliminates the possibility of the accumulating of similar phase angle deviations caused by successive command pulses.

Shown in FIG. 2 is a further embodiment of the present invention in which the input pulses are self-generated at a settable rate but in which the stabilizing system is capable of altering when each pulse is produced with respect to the nominal time when such a pulse would appear. A variable rate oscillator 40 has an output lead 41 on which the command pulses appear. The nominal rate or time when the pulses are to occur is set by an adjustable resistor 42 connected between the 4 and 7 terminals of the oscillator 40. The capacitor 21 and variable resistor 22 are connected to the 7 terminal with the other connection thereto being as in the previous embodiment. When the rotor leads the stator dictated position, the increased current to the 7 terminal causes a command pulse to appear in less time than normally as set by the resistor 42 while if the rotor is lagging, the decreased current applied to the terminal 7 causes a command pulse to issue slightly after the nominal delay.

In both embodiments of the invention, one form of the voltage control delay 20 and the variable rate oscillator 40 may be a monolithic timing circuit type NE/SS555 available from Signetics Corporation with such a device having terminals 1 through 8 as indicated. The value of the capacitor 21 may be 0.1 $\mu f$, the resistor 25, 10k to 100k ohms, the resistors 24 and 27 both 1k ohms, the resistor 28, 25 ohms, and the transistor 23 a type 2N2907. The other components associated with the voltage controlled delay are set to produce a nominal delay of about 50 micro-seconds when there is essentially no rotor deviation while the components associated with the oscillator 40 are those which cause the current from the capacitor 21 to produce command pulses that are delayed about + or −50 micro-seconds from when they would occur if the capacitor was not connected thereto. In the present system, the rate of the command pulses is generally no more than a few thousand per second and hence, even the longest delay will expire before the next stepping pulse is received.

It will accordingly be understood that there has been disclosed a circuit for minimizing the deviation of the rotor of a stepping motor from its stator energized commanded position by altering the instant when a change of energization is to occur. The present invention differs from the inventions previously disclosed in the previously mentioned applications by being especially applicable to unipolar wound stepping motors in which the winding of a pole is either energized or deenergized so that no reverse current is produced. However, by the discovery that the quantity of the decay current is representative of the deviation of the rotor, use is made thereof to produce a signal which is directly related to the quantity of the decay current exists. Thus even though another winding is instantaneously energized with the deenergization of a previously deenergized winding, the system is capable of producing a signal for controlling the time when the next change of energization is to occur and thus enhance stable operation of the stepping motor.

Variations and modifications may be made within the scope of the claims and portions of the improvements may be used without others.

We claim:

1. A pulse to step motor control circuit comprising a stepping motor having a plurality of unipolar windings, means for receiving a command pulse and essentially simultaneously changing the energization of the windings with the change deenergizing one winding and energizing another winding with a decay current being created in the deenergized winding, means for sensing the quantity of the decay current produced in the deenergized winding and producing a signal related thereto, means for normally providing command pulses and means for shifting the time when the command pulses are produced in accordance with the signal of the sensed quantity of the decay current.

2. The invention as defined in claim 1 in which signals related to a greater sensed quantity shifts the providing means to provide command pulses quicker than normal.

3. The invention as defined in claim 1 in which signals related to a lesser sensed quantity shifts the providing means to provide command pulses later than normal.

4. The invention as defined in claim 1 in which the means for sensing the quantity of the decay current senses both essentially the complete duration that the decay current flows and a direct proportion of the instantaneous values thereof.

5. The invention as defined in claim 4 in which there is a unidirectional power supply for providing the energy to energize the windings and in which there are means for directing a portion of the decay current back to the power supply means.

6. The invention as defined in claim 1 in which a present command pulse produces a present change of energization and in which the signal of the quantity of decay current caused by the present change of energization shifts the time for the next command pulse.

7. The invention as defined in claim 6 in which the means for providing command pulses provides a train of command pulses at a rate which causes the motor to operate in its mid-velocity range and in which the means for shifting receives a signal to control the shifting of each of said command pulses.

8. The invention as defined in claim 1 in which the means for providing command pulses includes means for receiving input pulses and means for providing a command pulse for each input pulse with the command pulse being provided after a normal delay after receipt of its corresponding input pulse.

9. The invention as defined in claim 8 in which the means for providing and the means for shifting produces a command pulse prior to the receipt of the next input pulse.

10. The invention as defined in claim 1 in which the means for providing includes an oscillator means for producing command pulses and means for adjusting the normal rate at which the oscillator means would produce command pulses.

11. The invention as defined in claim 1 in which there is a unidirectional power source having a power lead, in which each winding has one end connected to the power lead and its other end connected to a switching means, in which the means for sensing includes a diode connected to the other end of each winding and in which the diodes are connected in parallel to a common lead to conduct decay current from the other end of each winding to the common lead.

12. The invention as defined in claim 11 in which the sensing means includes a transistor connected to conduct current therethrough that is in direct proportion to the value of the decay current flowing in the common lead and in which there are means for directing the current through the transistor to a capacitor with the charge across the capacitor constituting the signal.

13. The method of reducing the deviation of the rotor of a unipolar energized stepping motor from the position dictated by its stator energized position comprising the steps of simultaneously deenergizing one winding and energizing another winding, sensing the quantity of the decay current that is created in the one winding and altering the instant inversely with the sensed quantity that the another winding is simultaneously deenergized and a third winding energized.

14. The invention as defined in claim 13 in which the windings are energized from a source of unidirectional power and in which there is the step of providing a path for a portion of the decay current to return to the power source.

* * * * *